(12) United States Patent
Mortensen

(10) Patent No.: US 11,486,364 B2
(45) Date of Patent: Nov. 1, 2022

(54) PREASSEMBLY SYSTEM AND METHOD FOR OPTIMAL POSITIONING OF TOWER STRUCTURES

(71) Applicant: Vestas Wind Systems A/S, Aarhus N. (DK)

(72) Inventor: Peter Sigfred Mortensen, Risskov (DK)

(73) Assignee: Vestas Wind Systems A/S, Aarhus N (DK)

( * ) Notice: Subject to any disclaimer, the term of this patent is extended or adjusted under 35 U.S.C. 154(b) by 31 days.

(21) Appl. No.: 17/251,309

(22) PCT Filed: Jun. 27, 2019

(86) PCT No.: PCT/DK2019/050208
§ 371 (c)(1),
(2) Date: Dec. 11, 2020

(87) PCT Pub. No.: WO2020/001721
PCT Pub. Date: Jan. 2, 2020

(65) Prior Publication Data
US 2021/0254602 A1 Aug. 19, 2021

(30) Foreign Application Priority Data

Jun. 27, 2018 (DK) .......................... PA 2018 70444

(51) Int. Cl.
*F03D 13/40* (2016.01)
*B63B 35/00* (2020.01)

(52) U.S. Cl.
CPC .............. *F03D 13/40* (2016.05); *B63B 35/00* (2013.01); *B63B 35/003* (2013.01); *F05B 2240/912* (2013.01); *F05B 2240/95* (2013.01)

(58) Field of Classification Search
CPC combination set(s) only.
See application file for complete search history.

(56) References Cited

U.S. PATENT DOCUMENTS

2010/0067989 A1  3/2010  Brown et al.

FOREIGN PATENT DOCUMENTS

| EP | 2444656 A2 | 4/2012 |
| KR | 101774854 B1 | 9/2017 |

(Continued)

OTHER PUBLICATIONS

Danish Patent and Trademar Office, Search and Examination Repjort in PA 201870444, dated Dec. 13, 2018.
(Continued)

*Primary Examiner* — Kyle Armstrong
(74) *Attorney, Agent, or Firm* — Wood Herron & Evans LLP

(57) ABSTRACT

The present invention relates to a preassembly system comprising a support arrangement and a plurality of tower structures each having a mean diameter, D, wherein said plurality of tower structures are placed vertically on the support arrangement during preassembly and/or storage, the support arrangement comprising a set of attachments means for each tower structure, said attachment means being configured for positioning said plurality of tower structures with a mutual distance, a, wherein the ratio a/D is below 2.3, such as below 2.2, such as below 2.1, such as below 2.0 in order to reduce loads on the plurality of tower structures due to Vortex shedding while being secured to the preassembly system. The present invention further relates to an associated method and a sea going vessel for transporting a plurality of vertically oriented tower structures.

15 Claims, 3 Drawing Sheets

(56) References Cited

FOREIGN PATENT DOCUMENTS

WO         2014139532 A1    9/2014
WO         2014158025 A1    10/2014

OTHER PUBLICATIONS

European Patent Office, International Search Report and Written Opinion in PCT Application No. PCT/DK2019/050208, dated Dec. 13, 2019.
Anonymous: "Offshore-Wind aus Deutschland für die Energiewende", Siemens, Aug. 7, 2013 (Aug. 7, 2013), pp. 1-5, XP055453705, Retrieved from Internet: URL:http://dudgeonoffshorewind.co.uk/news/news-08-01-17 [retrieved on Feb. 22, 2018].
TrickyWeb LTD: "Dudgeon Wind Garm News: First turbine installed at Dudgeon", Jan. 8, 2017 (Jan. 8, 2017), XP055650070, Retrieved from the Internet: URL:http://dudgeonoffshorewind.co.uk/news/news-08-011-17 [retrieved on Dec. 5, 2019].
United Wind Logistics develops and realises transport concept for MHI Vestas' V164 wind turbines, ALL ABOUT SHIPPING.co.uk, Jun. 27, 2017 [online], [retrieved on Dec. 5, 2018]. Retrieved from <http://www.allaboutshipping.co.uk/2017/06/27/united-wind-lgistics-develops-and-realises-transport-concept-for-mhi-vestas-v164-wind-turbines>.
MHI Vestas charters Vestvind to transport mammoth V164 turbine components, MHI Vestas Offshore Wind, Dec. 6, 2017, [online], [retrieved on Dec. 5, 2018], Retrieved from <http://www.mhivestasoffshore.com/mhi-vestas-chaters-industry-leading-vessel/>.

PREASSEMBLY SYSTEM AND METHOD FOR OPTIMAL POSITIONING OF TOWER STRUCTURES

FIELD OF THE INVENTION

The present invention relates to a preassembly system for mutually positioning a plurality of vertically oriented tower structures in an optimal manner in order to reduce loads on the plurality of tower structures due to Vortex shedding while being secured to the preassembly system. The present invention further relates to an associated method for positioning a plurality of tower structures.

BACKGROUND OF THE INVENTION

Vortex shedding also referred to as vortex induced vibration (VIV) is a phenomenon that occurs due to instability of the flow around an object, such as a tower structure, including a vertically oriented wind turbine tower. The instability of the flow will cause an oscillation of high and low pressure on the tower structure.

This issue has become more pronounced as wind turbine towers have grown bigger and can easily exceed 75 meters.

If a group of vertically oriented tower structures are positioned relatively close to each other, for example in connection with preassembling and/or storage including transporting, the instability of the flow around one tower structure will influence the other tower structures.

If no measures are taken the oscillations due to Vortex shedding can result in severe deflections of the tower structures.

At a critical wind speed the frequency of the oscillations coincide with the natural frequency of the tower. Here the deflections will be severe and may affect the life time of the tower for example due to enhanced fatigue damage and in principle risk of failure due to exceeding of ultimate strength of the tower structure. Moreover, the oscillations will not seize until the wind speed decrease below the critical wind speed. Therefore, it is not possible to approach the tower to apply mitigating measures. Thus, dampers or aerodynamic devices like strakes has to be introduced to protect the tower. Such dampers and strakes adds cost and complexity to the tower preassembly. Moreover, each have safety issues relating to their installation and subsequent removal.

It may be seen as an object of embodiments of the present invention to provide a method for mutually positioning a plurality of tower structures in an optimal manner in order to reduce loads on the plurality of tower structures due to Vortex shedding.

It may be seen as an object of embodiments of the present invention to provide a method of reducing the required damping capacity of an individual tower or a group of towers.

It may be seen as a further object of embodiments of the present invention to provide a preassembly system that allows that a plurality of tower structures may be mutually positioned in an optimal manner in order to reduce loads on the plurality of tower structures due to Vortex shedding.

BRIEF DESCRIPTION OF THE INVENTION

The above-mentioned objects are complied with by providing, in a first aspect, a preassembly system comprising a support arrangement and a plurality of vertically oriented tower structures each having a mean diameter, D, wherein said plurality of tower structures are placed on the support arrangement during preassembly and/or storage, the support arrangement comprising a set of attachments means for each tower structure, said attachment means being configured for positioning said plurality of tower structures vertically with a mutual distance, a, wherein the ratio a/D is below 2.3, such as below 2.2, such as below 2.1, such as below 2.0 in order to reduce loads on the plurality of tower structures due to Vortex shedding while being secured to the preassembly system.

Thus, the present invention relates, in a first aspect, to a preassembly system for preassembly and/or storage of a plurality of vertically oriented tower structures, such as wind turbine towers or wind turbine tower sections. The preassembly system is advantageous in that it may allow mutual positioning of the plurality of wind turbine towers so that the ratio a/D may be below 2.3, such as below 2.2, such as below 2.1, such as below 2.0.

In an embodiment according to the present invention, the preassembly system has attachment means configured with a ratio a/D within the range 1.8 to 2.3.

It has been found that the benefits of the invention are particular pronounced in this range. Further reduction of the ratio below 1.8 will still achieve the effect of the invention, but without significant further improvements, and particularly for very high tower structures, the risk of vortex shedding leading to tower structure top hitting a neighbouring tower structure may increase dramatically for the ratio below 1.8 and particularly for the ratio below 1.5.

The attachments means may be configured such that the distances between sets of attachment means may be adjustable. Thus, one set of attachment means may be adjustable relative to another set of attachment means. Each set of attachments means may comprise a plurality of attachment means. It should however be noted that the number of attachment means of one set may differ from the number of attachment means of another set of attachments means. In combination therewith the attachment means may be configured such that the distances between attachment means within a set of attachment means may be adjustable in order to account for different tower diameters.

The attachments means for attaching wind turbine towers to the support arrangement may be implemented in various ways, including properly shaped clamps, bolts etc.

The tower structure is a vertically oriented, elongated tubular structure with a circular or substantially circular cross section and a height, H, in the direction orthogonal to the circular cross section. The height, H, is calculated from the structural fixation to the top of the vertically oriented tower structure. The tower structure may be cylindrical, conical or having a combination of cylindrical and conical parts. Lattice towers being exposed to very different types of wind induced vibrations are therefore not within the scope of the present invention.

The term distance, including mutual distance, a, in relation to tower structures is here to be understood as a centre-to-centre distance between two neighboring tower structures having a mean diameter, D. Thus, when the mean diameter, D, of a given tower structures is known the attachment means may be placed to comply with the a/D<2.3 relation in advance, i.e. prior to attaching the tower structures to the attachment means. For cylindrical tower structures, D is the diameter; for conical tower structures and tower structures with a conical section, D, is the diameter in the middle of the conical section.

Vortex shedding is more pronounced for slim tall structures, and hence the advantage of arranging the tower structures with the a/D<2.3 was found to be particularly advantageous for vertically oriented tower structures having a height, H, to mean diameter, D, ratio (H/D) of between 12 to 25, and preferably with the H/D ratio in the range of 13 to 18. The height of the tower structure is preferably in at least 20 m but the advantage of the arranging the tower structures with the a/D<2.3 was more pronounced for height of about 50 m, such as 60 to 150 m.

The support arrangement may comprise a frame, wherein the attachment means may be attached to the frame.

The frame may comprise a plurality of sub-frames, wherein each sub-frame may comprise a set of attachment means, and wherein each sub-frame is free of other sub-frames of the plurality of sub-frames. Thus, the plurality of sub-frames may be allowed to move freely and independently relative to each other. The plurality of sub-frames may thus perform for example translational movements and rotations relative to each other. The set of attachment means of each sub-frame may comprise a plurality attachment means which may be movable relative to each other within the set.

Sets of attachments means may be arranged in at least one row, i.e. along at least one straight line. Alternatively, sets of attachments means may be arranged in a matrix comprising at least two parallel rows. The matrix may in principle take any form, such as a 2×2 matrix, a 3×3 matrix, a 4×4 matrix, a 2×3 matrix, a 2×4 matrix, a 3×4 matrix etc. Matrix forms are typically with tower structures in a square or rectangular arrangement, but the arrangement may be a skewed form.

In an alternative embodiment sets of attachment means may be arranged in a skewed formation, such as for example in a rhomb or hexagonal lay-out.

In another alternative embodiment sets of attachment means may be arranged in a triangular formation, such as for example in a triangular lay-out.

In an embodiment according to the present invention the support arrangement may be located on or forms part of a sea going vessel.

In a second aspect the present invention relates to a method for positioning a plurality of tower structures having a mean diameter, D, in a support arrangement comprising a set of attachments means for each of the tower structures, the method comprising the steps of positioning the plurality of tower structures with a mutual distance, a, wherein the ratio a/D is below 2.3, such as below 2.2, such as below 2.1, such as below 2.0 in order to reduce loads on the plurality of tower structures due to Vortex shedding while being secured to the support arrangement.

Prior to attaching the plurality of tower structures to sets of attachment means the attachment means may be correctly placed, i.e. placed so that a/D<2.3, where "a" is to be understood as a centre-to-centre distance of neighboring towers. The plurality of vertically oriented tower structures may essentially be identical tower structures. The arrangement of the attachment means may be implemented as discussed in relation to the first aspect of the present invention.

In a third aspect the present invention relates to a sea going vessel for transporting a plurality of vertically oriented tower structures having a mean diameter, D, the sea going vessel comprising a support arrangement comprising a set of attachments means for each tower structure, said attachment means being configured for positioning said plurality of vertically oriented tower structures with a mutual distance between neighboring tower structures, a, wherein the ratio a/D is below 2.3, such as below 2.2, such as below 2.1, such as below 2.0 in order to reduce loads on the plurality of tower structures due to Vortex shedding while being secured to the support arrangement. Here, transporting is considered a subgroup of storage of tower structures.

Similar to the first aspect the attachments means may be configured such that the distances between sets of attachment means may be adjustable. Thus, one set of attachment means may be adjustable relative to another set of attachment means. Each set of attachments means may comprise a plurality of attachment means. It should however be noted that the number of attachment means of one set may differ from the number of attachment means of another set. In combination therewith the attachment means may be configured such that the distances between attachment means within a set of attachment means may be adjustable.

The attachments means for attaching vertically oriented wind turbine towers to the support arrangement may be implemented in various ways, including properly shaped clamps, flanges, bolts etc.

Again, the term distance, including mutual distance, in relation to tower structures is here to be understood as a centre-to-centre distance between two vertically oriented tower structures having a mean diameter, D. Thus, when the mean diameter, D, of the tower structures is known the attachment means may be placed to comply with the a/D<2.3 relation prior to attaching the tower structures to the attachment means.

The support arrangement may comprise a frame, wherein the attachment means may be attached to the frame.

The frame may comprise a plurality of sub-frames, wherein each sub-frame may comprise a set of attachment means, and wherein each sub-frame is free of other sub-frames of the plurality of sub-frames. Thus, the plurality of sub-frames may be allowed to move freely and independently relative to each other. The plurality of sub-frames may thus perform for example translational movements and rotations relative to each other. The set of attachment means of each sub-frame may comprise a plurality of attachment means which may be movable relative to each other within the set.

A set of attachments means may be arranged in at least one row, i.e. along at least one straight line. Alternatively, a set of attachments means may be arranged in a matrix comprising at least two parallel rows. The matrix may in principle take any form, such as a 2×2 matrix, a 3×3 matrix, a 4×4 matrix, a 2×3 matrix, a 2×4 matrix, a 3×4 matrix etc.

In an alternative embodiment sets of attachment means may be arranged in a skewed formation, such as for example in a rhomb or hexagonal lay-out.

In another alternative embodiment sets of attachment means may be arranged in a triangular formation, such as for example in a triangular lay-out.

BRIEF DESCRIPTION OF THE DRAWINGS

The present invention will now be explained in further details with reference to the accompanying figures, wherein.

Figure 1:
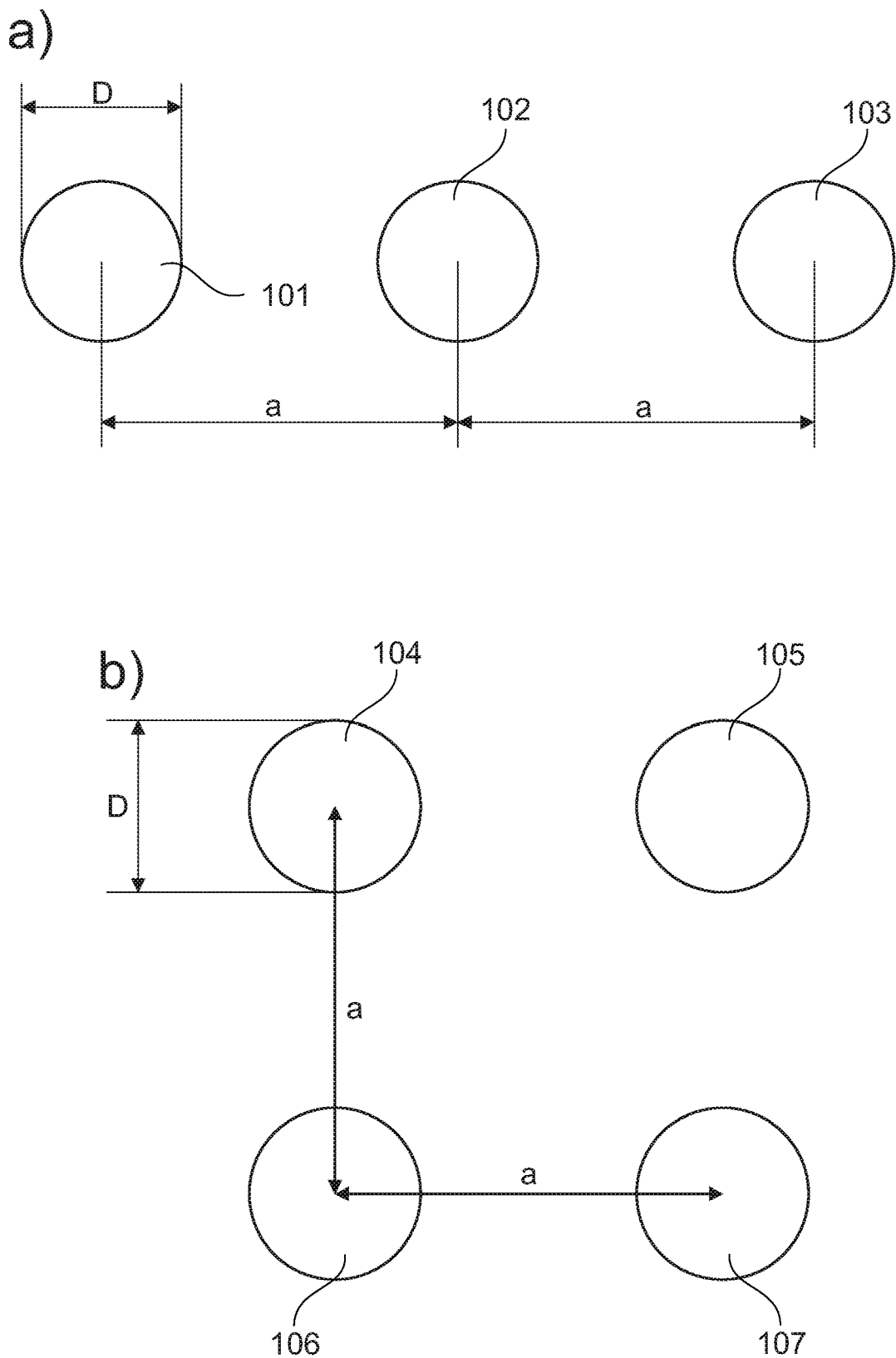
FIG. 1 shows a top view of three vertically oriented tower structures arranged in a row, and a top view of four tower structures arranged in a 2×2 matrix formation.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In a general aspect the present invention relates to a preassembly system that allows that a plurality of vertically oriented tower structures may be mutually positioned in an optimal manner in order to reduce loads on the plurality of tower structures due to Vortex shedding while being secured to the preassembly system.

Generally, a plurality of vertically oriented tower structures, such as wind turbine towers, may be mutually positioned in a one-dimensional formation, such as a row, or in a two-dimensional formation, such as for example 2×2, 3×3, 4×4 matrixes, rhomb's etc.

In order to reduce Vortex shedding induced loads on a plurality of essentially identical tower structures the tower structures may advantageously be positioned at a certain centre-to-centre distance, a, which depends on the mean diameter, D, of the tower structures.

Figure 3:
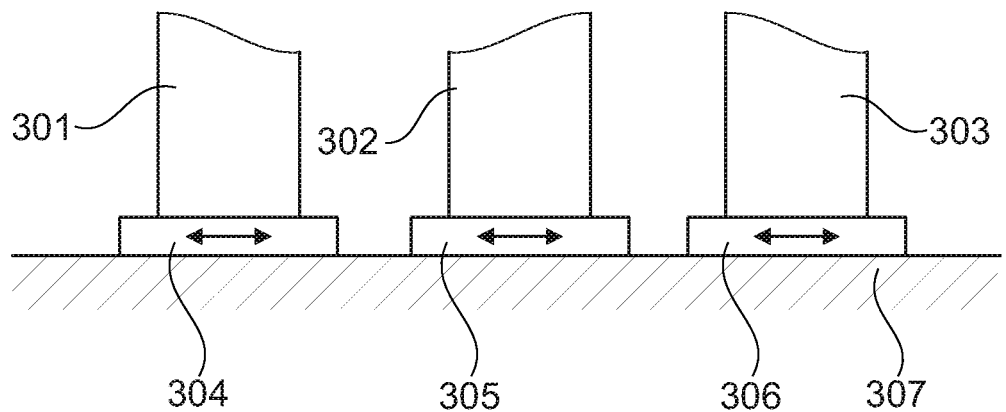
FIG. 3 shows a preassembly system according to the present invention.
Figure 3:
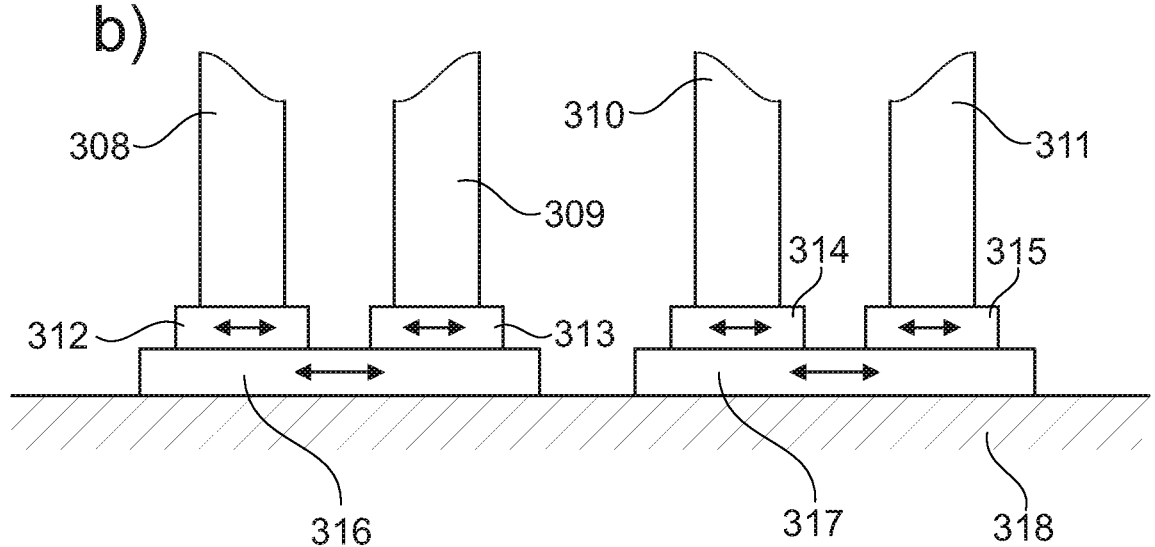

Referring now to FIG. 1a a top view of three vertically oriented wind turbine towers 101-103 arranged in a row is depicted. Each wind turbine tower has a mean diameter, D, and the centre-to-centre distance between neighboring the towers is denoted, a. The wind turbine towers 101-103 are positioned on a preassembly system during preassembly and/or storage of the wind turbine towers 101-103. As explained in further details in connection with FIG. 3 the preassembly system comprises a support arrangement. The support arrangement comprises, for each of the wind turbine towers 101-103, a set of attachments means configured for positioning the wind turbine towers relative to each other.

As depicted in FIG. 1a the vertically oriented wind turbine towers are positioned at a mutual centre-to-centre distance, a, so that the ratio a/D is below 2.3. In FIG. 1a the ratio a/D equals 2.25. By ensuring that the ratio a/D is below 2.3 the loads on the wind turbine towers 101-103 due to Vortex shedding is significantly reduced. It should be noted that the ratio a/D may be different from 2.25 as long as it is below 2.3. Thus, the ratio a/D may also be below 2.2, such as below 2.1, such as below 2.0. The lower limit of the ratio a/D is in theory 1 for cylindrical towers as in that this corresponds to the situation where the wind turbine tower 101-103 are positioned right next to each other without any opening therebetween. However, to avoid the tops of neighboring vertically oriented tower structures, the ratio a/D is preferably at least 1.5 and more preferably at least 1.8. This is particularly the case for conical tower structures and tower structures with a combination of conical and cylindrical parts. In general, it has been found that tower oscillations due to Vortex shedding are significantly reduced if the ratio a/D is within the range 1.8 to 2.3.

The mean diameter, D, is typically in the range 2.3 to 4.5 m yielding the typical centre-to-centre, a, to fall within the range 5 to 12 m.

Turning now to FIG. 1b a top view of four wind turbine towers 104-107 positioned in a square 2×2 matrix is depicted. Again, the wind turbine towers 104-107 are positioned on a preassembly system comprising a support arrangement that comprises a set attachment means for each of the wind turbine towers 104-107, cf. FIG. 3. The attachments means are configured so that the ratio between the centre-to-centre distance, a, and the mean diameter, D, is below 2.3, such as below 2.2, such as below 2.1, such as below 2.0, between neighboring wind turbine towers. The ratio a/D between diagonally positioned wind turbine towers, such as between towers 104 and 107, as well as between towers 105 and 106, is allowed to exceed the 2.3 limit, as these are not considered neighboring towers.

Figure 2:
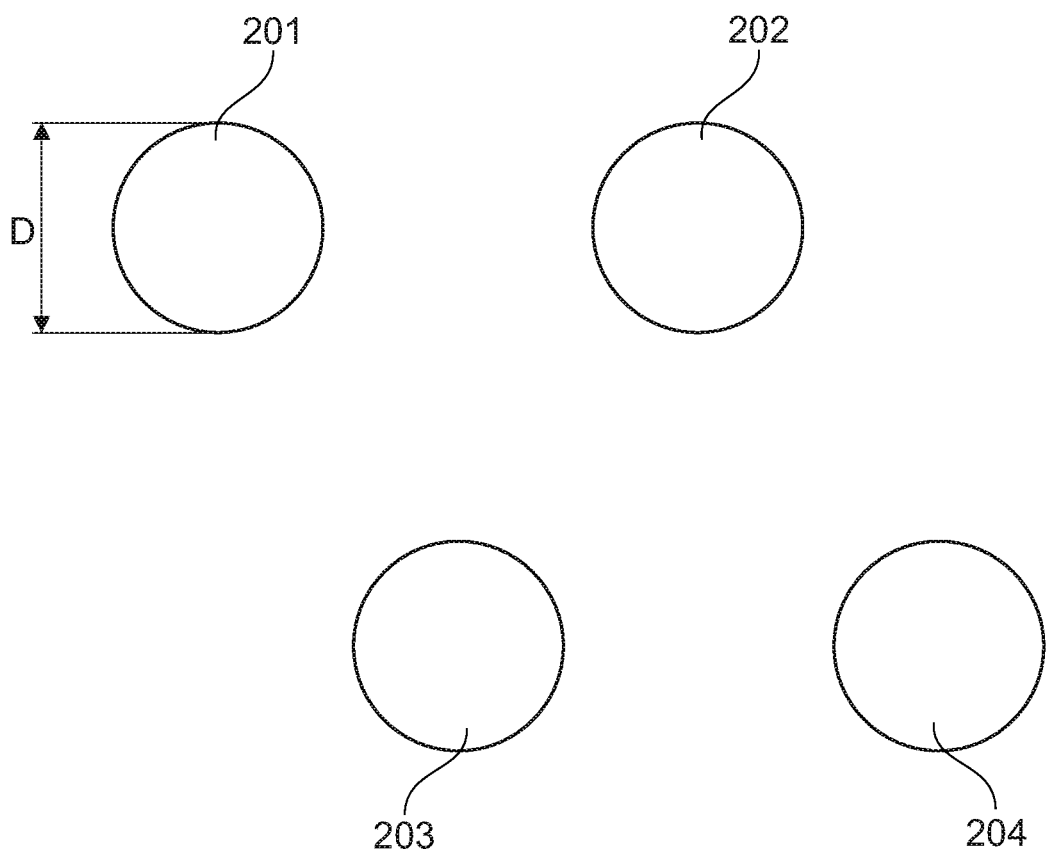
FIG. 2 shows a top view of four vertically oriented tower structures arranged in a rhomb formation.

FIG. 2 shows an alternative configuration where four vertically oriented wind turbine towers 201-204 are arranged in a skewed lay-out, in this embodiment resembling a rhomb where the ratio a/D between the diagonally arranged closest neighboring wind turbine towers 201/203, 202/203 and 202/204 is within the range 1.8 to 2.3.

Turning now to FIG. 3a a preassembly system for a plurality of vertically oriented wind turbine towers 301-303 is depicted. The preassembly system may be applied either on-shore or off-shore, such as on a sea going vessel adapted to transport wind turbine towers from an on-shore location to the site of mounting. An on-shore preassembly system may be applied in connection with preassembly and/or storage of wind turbine towers on an on-shore location.

The preassembly system comprises a static structure 307 to which static structure an appropriate number of support arrangements 304-306 are attached (preferably movably attached). Each support arrangement 304-306 comprises a set of attachment means for attaching a wind turbine tower thereto. The attachment means within sets of attachment means may be horizontally movable relative to each other in order to account for different wind turbine tower dimensions.

As addressed above the support arrangements 304-306 are configured for positioning the vertically oriented wind turbine towers 301-303 so that the ratio a/D is below 2.3, such as below 2.2, such as below 2.1, such as below 2.0 in order to reduce loads on the wind turbine towers due to Vortex shedding while being secured to the preassembly system. As previously mentioned "a" is the centre-to-centre distance between the wind turbine towers 301-303, and "D" is the mean diameter of the wind turbine towers 301-303 as defined above.

The support arrangements 304-306 may be adjusted to comply with the a/D<2.3 condition prior to positioning the vertically oriented wind turbine towers 301-303 thereon. Thus, when the mean diameters, D, of the wind turbine tower 301-303 are known, the support arrangements 304-306 may be mutually positioned accordingly. The adjustable support arrangements 304-306 may thus also account for different wind turbine tower diameters.

It should be noted that the number of vertically oriented wind turbine towers being attached to the preassembly system may of course differ from the three wind turbine towers 301-303 depicted in FIG. 3a.

Turning now to FIG. 3b the two vertically oriented wind turbine towers 308, 309 are attached to respective support arrangements 312, 313 which are attached (preferably movably attached) to the sub-frame 316. Similarly, the two wind turbine towers 310, 311 are attached to respective support arrangements 314, 315 which are movably attached to the sub-frame 317. Each of the sub-frames 316, 317 are movable attached to the static structure 318, and the sub-frames 316, 317 may be freely and independently moved relative to each other.

As depicted in FIG. 3b the wind turbine towers 308, 309 may be positioned relative to each other in order to comply with the a/D<2.3 relation by positioning the support arrangements 312, 313 relative to each other. Similarly, the vertically oriented wind turbine towers 310, 311 may be positioned relative to each other in order to comply with the a/D<2.3 relation by positioning the support arrangements 314, 315 relative to each other. Moreover, the wind turbine towers 308, 309 may, as a pair, be positioned relative to the wind turbine towers 310, 311, as a pair, by positioning the sub-frames 316, 317 relative to each other.

The number of vertically oriented wind turbine towers being attached to the preassembly system may of course differ from the four wind turbine towers 308-311 depicted in FIG. 3*b*. In addition, the number of wind turbine towers attached to each of the sub-frames 316, 317 may differ from the two wind turbine towers depicted in FIG. 3*b*. Moreover, the number of wind turbine towers attached to one sub-frame 316 may be different from the number of wind turbine towers attached to another sub-frame 317.

The preassembly system depicted in FIGS. 3*a* and 3*b* facilitates that the above-mentioned method for positioning a plurality of tower structures so that loads due to Vortex shedding are reduced may be carried out.

The invention claimed is:

1. A preassembly system comprising a support arrangement and a plurality of tower structures each having a mean diameter, D, a height, H, and H/D in the range of 12 to 25, wherein said plurality of tower structures are vertically oriented and placed on the support arrangement during preassembly and/or storage, the support arrangement comprising a set of attachments means for each tower structure, said attachment means being configured for positioning said plurality of tower structures vertically oriented with a mutual distance between closest neighboring towers, a, wherein the ratio a/D is between 1.8 and 2.3 in order to reduce loads on the plurality of tower structures due to Vortex shedding while being secured to the preassembly system.

2. The preassembly system according to claim 1, wherein the attachments means are configured such that the distances between sets of attachment means are adjustable.

3. The preassembly system according to claim 1, wherein the attachment means are configured such that the distance between attachment means within a set of attachment means is adjustable.

4. The preassembly system according to claim 1, wherein the support arrangement comprises a frame, wherein the attachment means are attached to the frame.

5. The preassembly system according to claim 4, wherein the frame comprises a plurality of sub-frames, and wherein each sub-frame comprising attachment means of the set of attachment means, and wherein each sub-frame is free of other sub-frames of the plurality of sub-frames.

6. The preassembly system according to claim 1, wherein the attachments means are arranged in at least one row.

7. The preassembly system according to claim 1, wherein the attachments means are arranged in a matrix comprising at least two parallel rows.

8. The preassembly system according to claim 1, wherein the support arrangement is located on or forms part of a sea going vessel.

9. A method for positioning a plurality of vertically oriented tower structures having a mean diameter, D, in a support arrangement comprising a set of attachments means for each of the tower structures, the method comprising the steps of positioning the plurality of tower structures vertically oriented with a mutual distance between closest neighboring towers, a, wherein the ratio a/D is between 1.8 and 2.3 in order to reduce loads on the plurality of tower structures due to Vortex shedding while being secured to the support arrangement.

10. The method according to claim 9, wherein the plurality of tower structures are essentially identical tower structures.

11. A sea going vessel for transporting a plurality of vertically oriented tower structures having a mean diameter, D, the sea going vessel comprising a support arrangement comprising a set of attachments means for each tower structure, said attachment means being configured for positioning said plurality of tower structures vertically oriented with a mutual distance, a, wherein the ratio a/D is between 1.8 and 2.3 in order to reduce loads on the plurality of tower structures due to Vortex shedding while being secured to the support arrangement.

12. The sea going vessel according to claim 11, wherein the attachments means are configured such that the distances between sets of attachment means are adjustable.

13. The sea going vessel according to claim 11, wherein the attachment means are configured such that the distance between attachment means within a set of attachment means is adjustable.

14. The sea going vessel according to claim 11, wherein the adjustable attachments means are arranged in at least one row.

15. The sea going vessel according to claim 11, wherein the adjustable attachments means are arranged in a matrix comprising at least two parallel rows.

* * * * *